United States Patent [19]
Strelow

[11] Patent Number: 5,139,397
[45] Date of Patent: Aug. 18, 1992

[54] CONNECTION PLUG FOR A DOUBLE CENTRIFUGAL PUMP

[75] Inventor: Günter Strelow, Bochum, Fed. Rep. of Germany

[73] Assignee: Wilo-Werk GmbH & Co. Pumpem- und Apparatebau, Dortmund, Fed. Rep. of Germany

[21] Appl. No.: 722,095

[22] Filed: Jun. 27, 1991

[30] Foreign Application Priority Data

Jul. 6, 1990 [DE] Fed. Rep. of Germany ....... 4021411

[51] Int. Cl.$^5$ .............................................. F04B 17/00
[52] U.S. Cl. ................................... 417/423.5; 417/422
[58] Field of Search .................. 417/422, 423.5, 423.3, 417/423.7, 426; 439/166, 170, 171, 173, 174, 175

[56] References Cited

U.S. PATENT DOCUMENTS 4,477,136 10/1984 Smith .
4,487,467 12/1984 Guerrero et al. .
4,738,584 4/1988 Price ..................................... 417/426
4,964,788 10/1990 Itameri-Kinter et al. .......... 417/422

FOREIGN PATENT DOCUMENTS 0351271 1/1990 European Pat. Off. .
1200410 9/1965 Fed. Rep. of Germany ...... 439/170
2951002 3/1980 Fed. Rep. of Germany .
58-88478 5/1983 Japan ................................... 417/426
2232011 11/1990 United Kingdom ................ 439/174

Primary Examiner—Richard A. Bertsch
Assistant Examiner—Alfred Basichas
Attorney, Agent, or Firm—Herbert Dubno; Yory Kateshov

[57] ABSTRACT

The invention relates to a double centrifugal pump having two electrically connected electric motors which project from the pump casing and are disposed parallel with one another in separate motor casings, there being diposed on each of the two electric motor casings an electric connection place to which a single plug can be attached which makes contact with the electric contacts of the two motor connection places.

8 Claims, 2 Drawing Sheets

CONNECTION PLUG FOR A DOUBLE CENTRIFUGAL PUMP

FIELD OF THE INVENTION

The invention relates to a double centrifugal pump having two electrically connected electric motors which project from the pump casing and are disposed parallel to one another in separate motor casings.

BACKGROUND OF THE INVENTION

It is known to connect the electric motors of double centrifugal pumps separately; the electric connecting cables can extend to a control apparatus. Usually a capacitor and a changeover switch or a step switch is provided for each pump. Such a construction is expensive to manufacture and assemble.

OBJECT OF THE INVENTION

It is an object of the invention so to improve a double centrifugal pump that the electric motors can be connected by means of a very simple construction, while facilitating manufacture and assembly.

SUMMARY OF THE INVENTION

This object is attained according to the invention in that disposed on each of the two electric motor casings is an electric connection place to which a single plug can be attached and which makes contact with the electric contacts of the two motor connection places.

After the pump has been assembled, a plug of the kind specified simply can be applied from the outside to the center of the end faces of the two motors to create the electric connections for said motors. This is particularly simple from the construction aspect and can be readily handled by a fitter. Preferably according to the invention each casing is formed with at least one recess, more particularly an aperture, and/or at least one projection respectively engaged in or covered by at least one projection and/or at least one recess or aperture in the plug.

Furthermore, according to the invention the plug bridges the gap between the two motors. Also advantageously the direction of application is axis-parallel with the motor axes.

Preferably according to the invention the plug can be applied in two positions which differ from one another by turning the plug through 180°. This feature enables the plug to be mounted in two positions, so that the connecting cable can extend from the plug to the particular side required. This means that the contacts are disposed symmetrically with respect to a plane parallel to the motor axes and midway between them. Alternatively, however, the feature can be used to create different connection conditions in the first position of the plug from those in the second position—i.e., as a result, for example, the voltage can be selected.

Particularly advantageously the plug has at least one changeover switch for the two motors. Also according to the invention the plug can have one capacitor for the two motors, so that a capacitor can be saved. A construction which is attractive in shape and saves space results if the capacitor projects on the outside of the plug in the direction of the pump casing and is disposed in the V-shaped intermediate space between the motor casings. Also advantageously the plug is inserted centrally in relation to the two motor casings.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
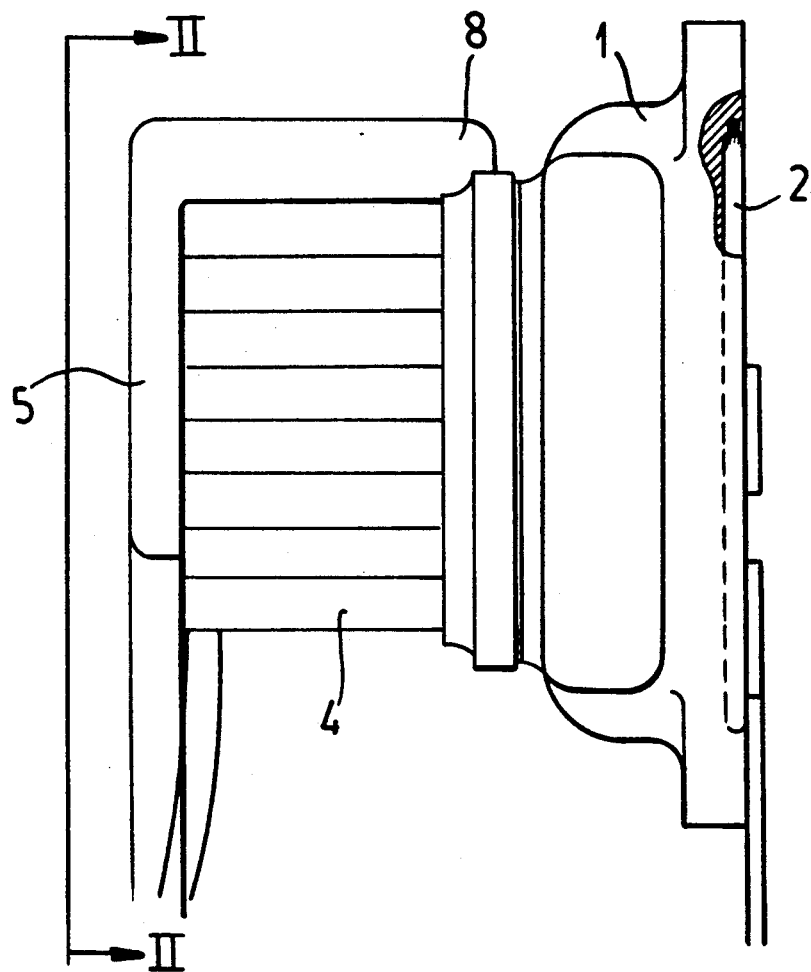
FIG. 1 is a side elevation of the double pump, partly broken away.
Figure 2:
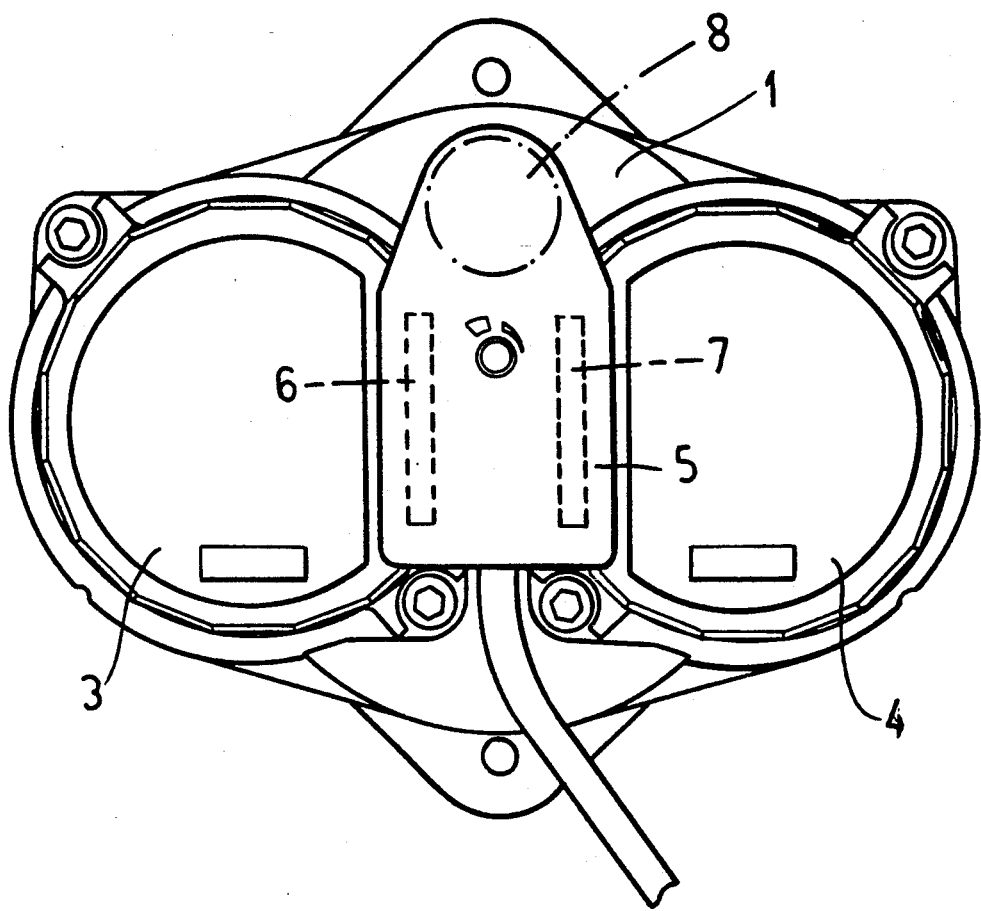
FIG. 2 is a view taken along the line II—II in FIG. 1.

A double pump can have two canned centrifugal pumps whose pump casing 1 has a large flat side surface 2 via which the pump can be attached to a surface of a consumption device. Casings 3, 4 of two electric motors are attached to the casing 1; the pump casings and motor casings can be formed on one level.

The casings 3, 4 of the two electric motors can be cylindrical or, as shown in the illustrated embodiment, can taper frustoconically outwards, the axes of the two motors lying parallel with one another. The intermediate space between the two motors is bridged by a plug 5 which partially covers the end face of the two electric motors and has on the side adjacent the motors plug strips along parallel chords or plug pins via which the plug extends into apertures in the end faces of the two motors, in order to make contact with the two electric motors.

Since the planes of the plug strips or plug projections 6, 7 extend parallel with the axes of the electric motors, the plug 5 can be applied to the pump in the axial direction. If the projections or plug strips or pins are disposed symmetrically, the plug can be applied to the pump in two different positions rotated through 180° in relation to one another, either to determine as a result the direction in which the connecting cable runs, or to supply the motors with different voltages.

The plug can have at least one changeover switch for the two motors, so that it is superfluous to provide a separate switch for each electric motor. In the same way, the plug can also have a single capacitor 8 which supplies the two motors.

A particularly attractively shaped, space-saving construction is obtained if the capacitor 8 projects on the outside of the plug in the direction of the pump casing and is disposed in the V-shaped intermediate space between the motor casings.

I claim:
1. A double centrifugal pump, comprising:
a pump casing;
a pair of motors mounted on said pump casing and formed with separate motor casings having parallel axes and corresponding ends;
a respective electrical connector on one end of each of said motor casings proximal to a gap between said motors and connected to electrically energize the respective motor; and
a single plug having contacts mating with both of said connectors, bridging said gap, disposed centrally of said motors, and being provided with a connecting cable for energization of said motors through said plug.
2. The double centrifugal pump defined in claim 1 wherein said connectors are formed in apertures extending along mutually parallel chords of the respective motor casing and said plug has projections engaging in said apertures.

3. The double centrifugal pump defined in claim 1 wherein said connectors are projections extending along mutually parallel chords of said motor casings and said plug is formed with apertures receiving said projections.

4. The double centrifugal pump defined in claim 1 wherein said connectors and said plug are configured so that said plug is applied to said connectors in an axis-parallel direction with respect to the motor axes.

5. The double centrifugal pump defined in claim 1 wherein said connectors and said plug are configured so that said plug is applied to said connectors in two orientations rotated through 180° with respect to one another.

6. The double centrifugal pump defined in claim 1, further comprising a switch for controlling said motors.

7. The double centrifugal pump defined in claim 1, further comprising a capacitor for operating said motors on said plug.

8. The double centrifugal pump defined in claim 7 wherein said capacitor projects from said plug into a V-shaped space between said motor casings and extends in a direction from said plug towards said pump casing.

* * * * *